US012528831B1

(12) United States Patent
Li et al.

(10) Patent No.: US 12,528,831 B1
(45) Date of Patent: Jan. 20, 2026

(54) LAYERED METAL-ORGANIC FRAMEWORK MATERIAL AND PREPARATION METHOD AND USE THEREOF

(71) Applicant: Beijing University of Technology, Beijing (CN)

(72) Inventors: Jianrong Li, Beijing (CN); Guangrui Si, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/931,132

(22) Filed: Oct. 30, 2024

(30) Foreign Application Priority Data

Dec. 21, 2023 (CN) ........................ 202311773231.1

(51) Int. Cl.
*C07F 7/00* (2006.01)
*B01D 53/50* (2006.01)
*B01D 53/81* (2006.01)
*B01J 20/22* (2006.01)

(52) U.S. Cl.
CPC ............ *C07F 7/003* (2013.01); *B01D 53/508* (2013.01); *B01D 53/81* (2013.01); *B01J 20/226* (2013.01)

(58) Field of Classification Search
CPC ...................................................... C07F 7/003
See application file for complete search history.

(56) References Cited

U.S. PATENT DOCUMENTS

2021/0138385 A1 5/2021 Wade et al.

FOREIGN PATENT DOCUMENTS

| | | | |
|---|---|---|---|
| CN | 109400899 | A | 3/2019 |
| CN | 109776504 | A | 5/2019 |
| CN | 113368824 | A | 9/2021 |
| CN | 113620878 | A | 11/2021 |

OTHER PUBLICATIONS

American Chemical Society. Chemical Abstract Service. RN 1609557-25-6. Entered into STN: Jun. 4, 2014. (Year: 2014).*

Guangrui Si, et al., A stable Co(II)-based metal-organic framework with dual-functional pyrazolate-carboxylate ligand: Construction and CO2 selective adsorption and fixation, Chinese Chemical Letters, 2021, pp. 918-922, vol. 32.

Dong-Hui Chen, et al., Syntheses, structures and luminescence properties of five coordination polymers based on designed 2,7-bis (4-benzoic acid)-N-(4-benzoic acid) carbazole, CrystEngComm, 2017, pp. 2632-2643, vol. 19.

* cited by examiner

*Primary Examiner* — John S Kenyon
(74) *Attorney, Agent, or Firm* — Bayramoglu Law Offices LLC

(57) ABSTRACT

A layered metal-organic framework (MOF) material and a preparation method and use thereof are provided. The layered MOF material has a chemical formula of $[Zr_6(\mu_3\text{-}O)_4(\mu_3\text{-}OH)_4(OH)_4(H_2O)_4(HPCDA)_4]$, where the organic ligand ($H_3PCDA$) is 4,4'-(9-(1H-pyrazol-4-yl)-9H-carbazol-3,6-diyl)dibenzoic acid. The MOF is synthesized as follows: under closed conditions, the organic ligand 4,4'-(9-(1H-pyrazol-4-yl)-9H-carbazol-3,6-diyl)dibenzoic acid and a zirconium salt are allowed to undergo a solvothermal reaction in an organic solvent to produce a crystal of the MOF material. The MOF material can allow the reversible reactive capture of $SO_2$.

5 Claims, 11 Drawing Sheets

LAYERED METAL-ORGANIC FRAMEWORK MATERIAL AND PREPARATION METHOD AND USE THEREOF

CROSS REFERENCE TO THE RELATED APPLICATIONS

This application is based upon and claims priority to Chinese Patent Application No. 202311773231.1, filed on Dec. 21, 2023, the entire contents of which are incorporated herein by reference.

TECHNICAL FIELD

The present disclosure relates to a metal-organic coordination polymer material, and belongs to the technical field of crystalline materials. Specifically, the present disclosure relates to a layered metal-organic framework (MOF) material and a preparation method and use thereof.

BACKGROUND

As a class of novel organic-inorganic porous materials, MOFs have been widely used in fields such as gas storage and separation, water treatment, fluorescence detection, and catalysis due to their characteristics such as diversified structures, adjustable sizes, and large specific surface areas. The diversified secondary building units (SBUs) and organic ligands make the controllable synthesis of MOFs possible. The reasonable design and synthesis of organic ligands is an effective means to allow the diversification and functionalization of MOFs.

Single highly-symmetric carboxylic acid or pyrazole ligands have been extensively studied due to their numerous types and diversified structures. In recent years, scholars inside and outside China have constructed a series of representative MOFs such as NU-1000 and Co-BDP with single lowly-symmetric carboxylic acid or pyrazole ligands. There are relatively few studies on the synthesis of MOFs with lowly-symmetric carboxylic acid-pyrazole ligands. The carboxylic acid-pyrazole ligands can coordinate with different metal ions or SBUs to construct MOF materials with large sizes.

Sulfur dioxide ($SO_2$) is a harmful gas that jeopardizes the environment and human health. Thus, the reduction of emissions of sulfur dioxide is essential for environmental protection. Currently, there are a variety of techniques to remove $SO_2$ from industrial exhaust gases. These techniques mainly include wet, semi-dry, and dry desulfurization techniques. The technology for removing sulfur dioxide based on dry adsorption has the potential to reduce energy consumption and waste production. While physical adsorbents such as porous carbon, zeolites, and porous organic polymers have been studied accordingly, the use of these physical adsorbents in treating trace amounts (500 ppm to 3,000 ppm) of $SO_2$ is limited to some extent because of the low selectivity of these physical adsorbents for $SO_2$ relative to $CO_2$ and $H_2O$. MOFs are potential materials for gas separation and purification. Some MOFs, such as MFM-101 and MFM-170, exhibit a high $SO_2$ adsorption capacity under atmospheric pressure, but the MOF-$SO_2$ binding is weak, which limits the performance of these MOFs under low pressures. In addition, the co-adsorption of water may reduce an adsorption capacity for $SO_2$ and may even promote the hydrolysis or degradation of MOFs. Therefore, although MOFs exhibit excellent adsorption characteristics, when MOFs are used for treating trace $SO_2$, it is necessary to solve the problems such as a low MOF-$SO_2$ binding strength and possible impacts caused by the co-adsorption of water. Further research and development is required to overcome these challenges so as to make MOFs an efficient option for treating trace $SO_2$.

SUMMARY

The present disclosure is intended to provide a layered MOF material and a preparation method and use thereof.

A first objective of the present disclosure is to provide a layered MOF material with a chemical formula of $[Zr_6(\mu_3\text{-}O)_4(\mu_3\text{-}OH)_4(OH)_4(H_2O)_4(HPCDA)_4]$. The layered MOF material is named BUT-86, and a ligand of the BUT-86 is 4,4'-(9-(1H-pyrazol-4-yl)-9H-carbazol-3,6-diyl)dibenzoic acid (abbreviated as $H_3PCDA$).

In the chemical formula, $Zr_6(\mu_3\text{-}O)_4(\mu_3\text{-}OH)_4(OH)_4(H_2O)_4$ is a $Zr_6$ cluster, $\mu_3$-O/$\mu_3$-OH is a bridging oxygen atom on the $Zr_6$ cluster, OH/$H_2O$ is a hydroxide ion/water molecule on the $Zr_6$ cluster, and $HPCDA^{2-}$ is a ligand with two protons removed.

Further, from the perspective of frame connection and construction, a crystal structure of the layered MOF material is a tetragonal crystal system, with a space group of $P4_2$/nmc and the following unit cell parameters: a=b=18.5994(±2) Å, c=32.9902(±4) Å, α=β=γ=90°, and V=11412.6(±3) Å$^3$.

Further, the Zr6 cluster includes first $Zr^{4+}$ and second $Zr^{4+}$ that have different connection relationships; the first $Zr^{4+}$ coordinates with four O atoms from different ligands, two $\mu_3$-O, and two $\mu_3$-OH; the second $Zr^{4+}$ coordinates with two O atoms from different ligands, two $\mu_3$-O, two $\mu_3$-OH, one terminal OH, and one terminal $H_2O$; and three first $Zr^{4+}$ and three second $Zr^{4+}$ produce the $Zr_6$ cluster through the $\mu_3$-O and the $\mu_3$-OH.

Further, a structure of the BUT-86 includes an 8-connected $Zr_6$ cluster and a bent $HPCDA^{2-}$ ligand.

The $HPCDA^{2-}$ ligand is paired with a neighboring ligand in a face-to-face manner through a C—H • • • π interaction (with a C—H • • • C distance of 3.42 Å) on a benzene ring of the $HPCDA^{2-}$ ligand to connect two $Zr^6$ clusters. The $Zr_6$ cluster is alternately connected with the $HPCDA^{2-}$ ligand to produce a two-dimensional layered structure. Layers are arranged alternately in parallel and in opposite directions. Layers in opposite directions interact with each other through strong hydrogen bonding (with an O • • • N distance of 2.83 Å) between the $\mu_3$-OH and a nitrogen atom of a pyrazolyl group on the $Zr_6$ cluster to produce a three-dimensional structure.

Further, from the perspective of topology analysis, the two-dimensional layered structure of the BUT-86 is an sql topological network; and in the BUT-86, the pyrazolyl group protrudes from a plane of the $Zr_6$ cluster and acts on a neighboring layer extending in an opposite direction through hydrogen bonding, and adjacent layers are arranged in an interdigitated manner to form a three-dimensional structure.

Further, the MOF material has an octahedral polygonal cavity along a and b axes, and side lengths of the cavity are 8.91 Å, 15.39 Å, and 16.90 Å, respectively.

A second objective of the present disclosure is to provide a novel ligand 4,4'-(9-(1H-pyrazol-4-yl)-9H-carbazol-3,6-diyl)dibenzoic acid (abbreviated as $H_3PCDA$) and a preparation method thereof.

A central core of the ligand is a carbazolyl group connected with a first benzoic acid group, a second benzoic acid group, and a pyrazolyl group; an angle between a first dashed line formed due to extension of the first benzoic acid group to the carbazolyl group and a second dashed line formed due to extension of the second benzoic acid group to the carbazolyl group is 90°; included angles of the pyrazolyl group with the first dashed line and the second dashed line each are independently 135°; and a specific structural formula of the $H_3PCDA$ is as follows:
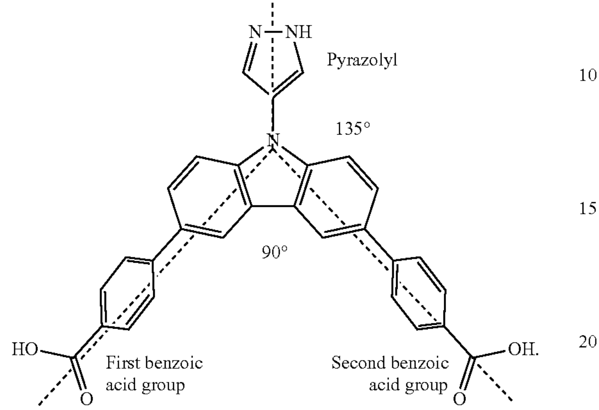
Further, a chemical equation for preparation of the $H_3PCDA$ is as follows:
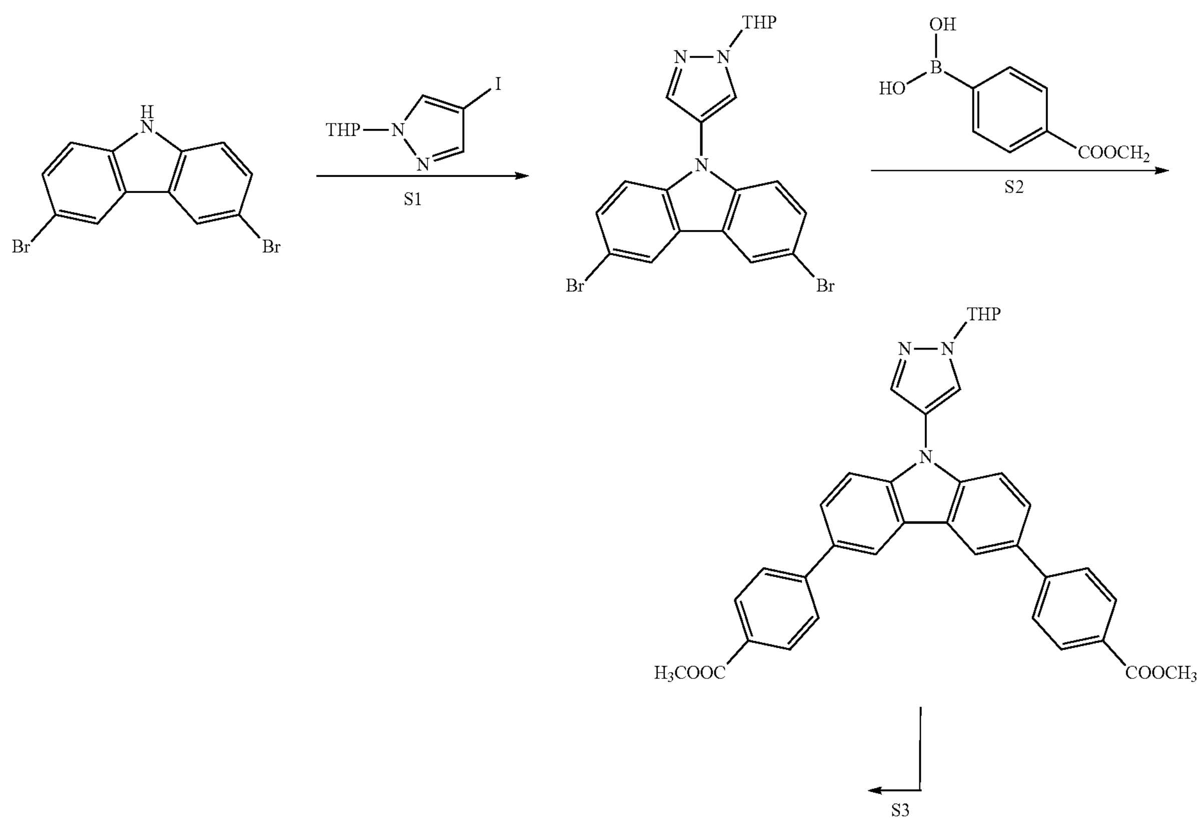

-continued

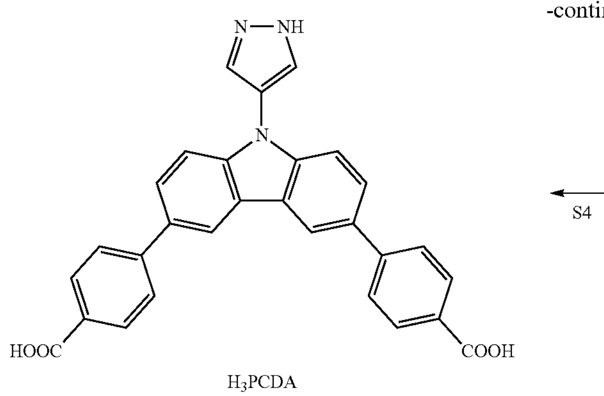

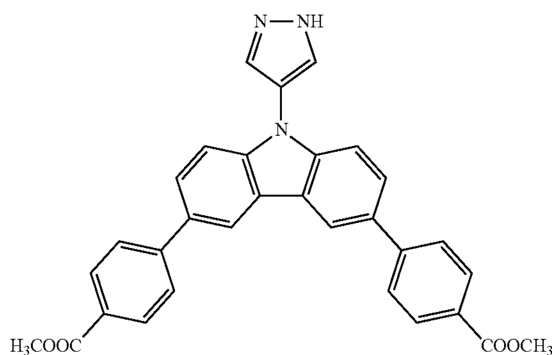

A preparation process specifically includes the following four steps:

S1, mixing 3,6-dibromo-9H-carbazole, 4-iodo-1-(tetrahydro-2H-pyran-2-yl)-1H-pyrazole, cesium carbonate, lithium chloride, cuprous iodide, and N,N-dimethylformamide (DMF), and conducting a reaction for 24 h to 48 h at a pressure of 0.1 MPa to 0.3 MPa and a temperature of 80° C. to 110° C. in an inert atmosphere to obtain 3,6-dibromo-9-(1-(tetrahydro-2H-pyran-2-yl)-1H-pyrazol-4-yl)-9H-carbazole, where the 3,6-dibromo-9H-carbazole, the 4-iodo-1-(tetrahydro-2H-pyran-2-yl)-1H-pyrazole, the cesium carbonate, the lithium chloride, and the cuprous iodide are in a weight ratio of 20.0:(18.1-20.7):(18.7-21.6):(5.4-7.4):(0.6-0.8), and a concentration of the 3,6-dibromo-9H-carbazole in the DMF is 60 g/L to 70 g/L;

S2, mixing the 3,6-dibromo-9-(1-(tetrahydro-2H-pyran-2-yl)-1H-pyrazol-4-yl)-9H-carbazole, 4-(methoxycarbonyl)phenyl)boronic acid, potassium carbonate, tetrakis(triphenylphosphine)palladium, and 1,4-dioxane, and conducting a reaction for 12 h to 24 h at a pressure of 0.1 MPa to 0.3 MPa and a temperature of 80° C. to 100° C. in an inert atmosphere to obtain dimethyl 4,4'-(9-(1-(tetrahydro-2H-pyran-2-yl)-1H-pyrazol-4-yl)-9H-carbazol-3,6-diyl)dibenzoate, where the 3,6-dibromo-9-(1-(tetrahydro-2H-pyran-2-yl)-1H-pyrazol-4-yl)-9H-carbazole, the 4-(methoxycarbonyl)phenyl) boronic acid, the potassium carbonate, and the tetrakis (triphenylphosphine)palladium are in a weight ratio of 15:(12.5-14.5):(13.1-14.4):(3.7-4.6), and a concentration of the 3,6-dibromo-9-(1-(tetrahydro-2H-pyran-2-yl)-1H-pyrazol-4-yl)-9H-carbazole in the 1,4-dioxane is 60 g/L to 65 g/L;

S3, allowing the dimethyl 4,4'-(9-(1-(tetrahydro-2H-pyran-2-yl)-1H-pyrazol-4-yl)-9H-carbazol-3,6-diyl) dibenzoate to undergo a reaction under reflux for 8 h to 12 h in a hydrochloric acid-ethanol solution with a concentration of 2 M, adding deionized water, adjusting a pH to 8 to 10 to make a precipitate completely precipitated, and conducting suction filtration to obtain methyl 4-(3,6-bis(1H-pyrazol-4-yl)-9H-carbazol-9-yl) benzoate, where a concentration of the dimethyl 4,4'-(9-(1-(tetrahydro-2H-pyran-2-yl)-1H-pyrazol-4-yl)-9H-carbazol-3,6-diyl)dibenzoate in the hydrochloric acid-ethanol solution is 30 g/L to 40 g/L, and a volume ratio of the hydrochloric acid-ethanol solution to the deionized water is 1:1 to 1:3; and S4, allowing the methyl 4-(3,6-bis(1H-pyrazol-4-yl)-9H-carbazol-9-yl)benzoate to undergo a reaction under reflux for 8 h to 12 h in a mixture of potassium hydroxide, tetrahydrofuran, methanol, and deionized water, adjusting a pH to 6 to 8 to make a precipitate completely precipitated, and conducting suction filtration to obtain the ligand, where a weight ratio of the methyl 4-(3,6-bis(1H-pyrazol-4-yl)-9H-carbazol-9-yl) benzoate to the potassium hydroxide is 2.1:(3.0-5.0), a concentration of the methyl 4-(3,6-bis(1H-pyrazol-4-yl)-9H-carbazol-9-yl)benzoate in the tetrahydrofuran is 23 g/L to 35 g/L, and the tetrahydrofuran, the methanol, and the deionized water are in a volume ratio of 1:(1-1.5):(1-1.5).

A third objective of the present disclosure is to provide a preparation method of the layered MOF material.

mixing a ligand, a metal salt, and a solvent, and conducting a reaction for 12 h to 48 h at a pressure of 0.1 MPa to 0.5 MPa and a temperature of 80° C. to 135° C. in an inert atmosphere to obtain the layered MOF material. The metal salt is selected from one or more of zirconium tetrachloride and zirconium oxychloride octahydrate. When the metal salt is a mixture of the zirconium tetrachloride and the zirconium oxychloride octahydrate, a molar ratio of the zirconium tetrachloride to the zirconium oxychloride octahydrate is 1:(1-2). When the solvent is a mixture of water and an organic solvent, a volume ratio of the water to the organic solvent is (0.2-0.8):(1-4). Preferably, the organic solvent is one or more of DMF, acetic acid, dimethyl sulfoxide (DMSO), and N-methylpyrrolidone (NMP). A molar ratio of the ligand to the metal salt is 1:(2-6). A concentration of the metal salt in the solvent is 0.04 mol/L to 0.15 mol/L.

A fourth objective of the present disclosure is to provide a use of the layered MOF material in gas adsorption and especially in adsorption and capture of $SO_2$.

The present disclosure has the following beneficial technical effects:

1. The present disclosure proposes a layered MOF material based on a bifunctional ligand Zr and a synthesis method thereof. The layered MOF material has a novel two-dimensional layered structure with a large specific surface area and high stability. The synthesis method is simple. The layered MOF material based on the bifunctional ligand Zr is the first Zr-MOF with an interdigitated sql network, which enhances the stability of the material and promotes the excellent recognition and adsorption of guest molecules.
2. The present disclosure provides a novel ligand, namely 4,4'-(9-(1H-pyrazol-4-yl)-9H-carbazol-3,6-diyl)dibenzoic acid. This ligand has a unique structure, and can be synthesized from easily-available raw materials by a simple and efficient synthesis route with a high yield.

3. The layered MOF material based on the ligand Zr provided in the present disclosure exhibits a high adsorption capacity for $SO_2$ and has an ability to capture trace $SO_2$ at a high humidity. The layered MOF material has a potential application value in the adsorption and capture of $SO_2$, and is currently the first MOF material reported to allow the reversible reactive capture of $SO_2$.
4. The organic ligand synthesized by the present disclosure is a novel pyrazole-carboxylic acid ligand. The MOF material of the present disclosure has a novel structure, a stable frame, a large pore size, and a large specific surface area, and has a potential application in the capture of $SO_2$.

DETAILED DESCRIPTION OF THE EMBODIMENTS

The present disclosure is further described below with reference to examples, but the present disclosure is not limited to the following examples.

Example 1

20.0 g of 3,6-dibromo-9H-carbazole, 20.5 g of 4-iodo-1-(tetrahydro-2H-pyran-2-yl)-1H-pyrazole, 21.0 g of cesium carbonate, 6.3 g of lithium chloride, 0.7 g of cuprous iodide, and 300 mL of DMF were added to a 500 mL three-necked flask and stirred in a nitrogen atmosphere at a pressure of 0.1 MPa, a temperature of 100° C., and a rotational speed of 200 rpm to allow a reaction for 48 h. After the reaction was complete, the mixture was cooled to room temperature, filtered, and purified through a silica gel column to obtain 3,6-dibromo-9-(1-(tetrahydro-2H-pyran-2-yl)-1H-pyrazol-4-yl)-9H-carbazole.

15.0 g of the 3,6-dibromo-9-(1-(tetrahydro-2H-pyran-2-yl)-1H-pyrazol-4-yl)-9H-carbazole obtained in the above step, 13.2 g of 4-(methoxycarbonyl)phenyl)boronic acid, 13.9 g of potassium carbonate, 3.9 g of tetrakis(triphenylphosphine)palladium, and 250 mL of 1,4-dioxane were added to a 500 mL three-necked flask, and stirred in a nitrogen atmosphere at a pressure of 0.1 MPa, a temperature of 100° C., and a rotational speed of 200 rpm to allow a reaction for 24 h. After the reaction was complete, the mixture was cooled to room temperature, filtered, and purified through a silica gel column to obtain dimethyl 4,4'-(9-(1-(tetrahydro-2H-pyran-2-yl)-1H-pyrazol-4-yl)-9H-carbazol-3,6-diyl)dibenzoate.

3.0 g of the dimethyl 4,4'-(9-(1-(tetrahydro-2H-pyran-2-yl)-1H-pyrazol-4-yl)-9H-carbazol-3,6-diyl)dibenzoate obtained in the above step and 100 mL of a 2 M hydrochloric acid-ethanol solution were added to a 250 mL three-necked flask, subjected to a reaction under reflux at 50° C. for 24 h, and then subjected to vacuum distillation, then 100 mL of deionized water and ammonia water were added until a precipitate was completely precipitated, and the precipitate was separated through filtration to obtain methyl 4-(3,6-bis(1H-pyrazol-4-yl)-9H-carbazol-9-yl)benzoate.

Figure 1:
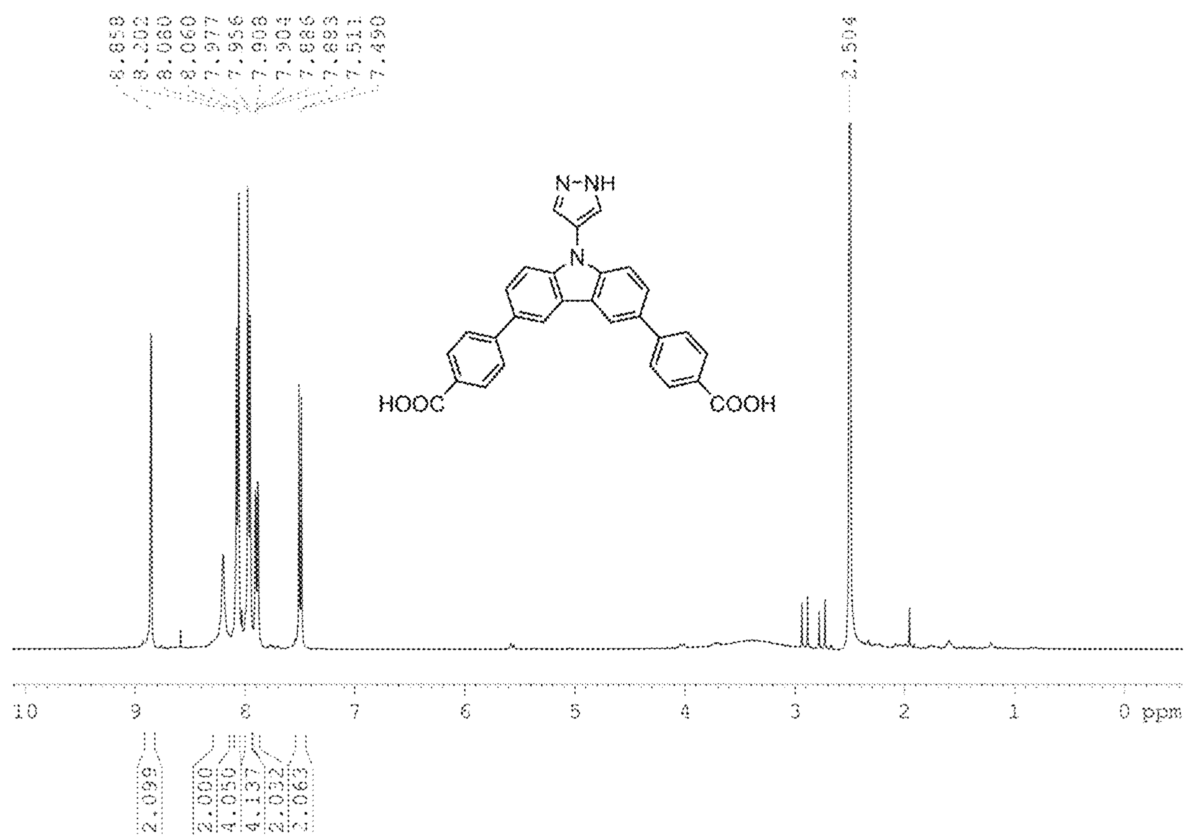
FIG. 1 shows a $^1H$ nuclear magnetic resonance spectrum of a lowly-symmetric pyrazole-carboxylic acid ligand.

2.1 g of the methyl 4-(3,6-bis(1H-pyrazol-4-yl)-9H-carbazol-9-yl)benzoate obtained in the above step, 3.0 g of potassium hydroxide, 60 mL of deionized water, 60 mL of tetrahydrofuran, and 60 mL of methanol were added to a 250 mL three-necked flask, subjected to a reaction under reflux at 70° C. for 24 h, and then filtered to obtain a filtrate, 2 M dilute hydrochloric acid was added dropwise to the filtrate until a precipitate was completely precipitated, and the precipitate was separated through suction filtration and dried to obtain 4,4'-(9-(1H-pyrazol-4-yl)-9H-carbazol-3,6-diyl)dibenzoic acid. A $^1H$ nuclear magnetic resonance spectrum of the 4,4'-(9-(1H-pyrazol-4-yl)-9H-carbazol-3,6-diyl)dibenzoic acid was shown in FIG. 1. The $^1H$ nuclear magnetic resonance spectrum of the lowly-symmetric pyrazole-carboxylic acid ligand in FIG. 1 indicates that the product is indeed 4,4'-(9-(1H-pyrazol-4-yl)-9H-carbazol-3,6-diyl)dibenzoic acid, which is abbreviated as $H_3PCDA$.

Example 2

The organic ligand $H_3PCDA$ (0.02 mmol) prepared in Example 1 and $ZrOCl_2\cdot 8H_2O$ (0.08 mmol) were thoroughly mixed in 2.0 mL of DMF, 0.1 mL of deionized water was added, followed by sealing into a vial. A thermal reaction was conducted at 120° C. for 36 h to obtain an MOF crystal.

Example 3

The organic ligand $H_3PCDA$ (0.02 mmol) prepared in Example 1 and $ZrOCl_2\cdot 8H_2O$ (0.12 mmol) were thoroughly mixed in 1.0 mL of DMF, 0.4 mL of deionized water was added, followed by sealing into a vial. A thermal reaction was conducted at 135° C. for 12 h to obtain an MOF crystal.

Example 4

The organic ligand $H_3PCDA$ (0.02 mmol) prepared in Example 1 and $ZrOCl_2\cdot 8H_2O$ (0.04 mmol) were thoroughly mixed in 0.5 mL of DMF, 0.25 mL of deionized water was added, followed by sealing into a vial. A thermal reaction was conducted at 80° C. for 48 h to obtain an MOF crystal.

Test results of the products obtained in Examples 2 to 4 are not much different, and the products have consistent crystal structures. With Example 2 as an example, specific test results are as follows: In the following test processes, if a sample amount is insufficient, the preparation process in Example 2 is repeated to provide a sufficient test sample.

(1) Determination of a Crystal Structure:

The single crystal obtained in Example 2 was selected and tested by an Agilent Technologies SuperNova X-ray single-crystal diffractometer at 333 K to acquire data. The data was acquired with Cu-Kα (λ=1.54178 Å) target rays monochromatized by a monochromatic filter. The absorption correction of the data was conducted with the SCALE3 ABSPACK software. The crystal structure was determined by a direct manner with the SHELXTL-97 program. Coordinates of all non-hydrogen atoms were first determined by a difference function and least squares, positions of hydrogen atoms were determined by theoretical hydrogenation, and then the crystal structure was refined by SHELXTL-97. Crystallographic data is shown in Table 1.

TABLE 1

Crystallographic data of the MOF material

| | |
|---|---|
| Chemical formula | $(C_{58}H_{42}N_6O_{16}Zr_3)_n$ |
| Molecular weight | 2693.17 |
| Temperature | 333(2)K |
| Crystal system | Tetragonal crystal system |
| Space group | $P4_2/nmc$ |
| Unit cell parameter | a = 18.5994(2) Å |
| | b = 18.5994(2) Å |
| | c = 32.9902(4) Å |
| | α = 90° |
| | β = 90° |
| | γ = 90° |
| Unit cell volume | 11412.6(3) $Å^3$ |
| Density (calculated) | 0.784 g $cm^{-3}$ |
| Wavelength | 1.54178 Å |
| θ angle range | 3.644-67.679° |
| Refinement method | Least squares |
| Absorption correction | multi-scans |
| F2-based confidence degree | 0.992 |
| Final R factor (I > 2σ (I)) | $R_1$ = 0.0348, $wR_2$ = 0.0850 |
| R factor (all data) | $R_1$ = 0.0385, $wR_2$ = 0.0872 |

The crystal structure of the MOF is shown in FIGS. 2A-2H and FIG. 3.

Figure 2A:
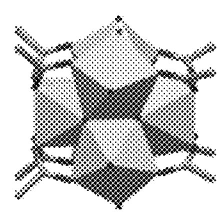
FIG. 2A shows an 8-connected $Zr_6(\mu_3\text{-}O)_4(\mu_3\text{-}OH)_4(OH)_4(H_2O)_4$ cluster.
Figure 2B:
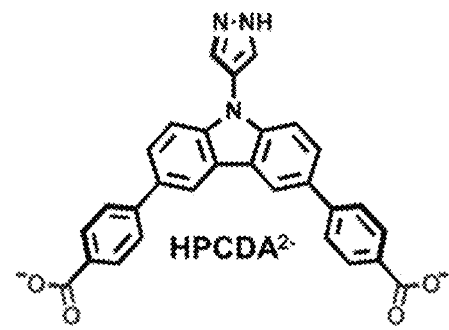
FIG. 2B shows an $HPCDA^{2-}$ ligand.
Figure 2C:
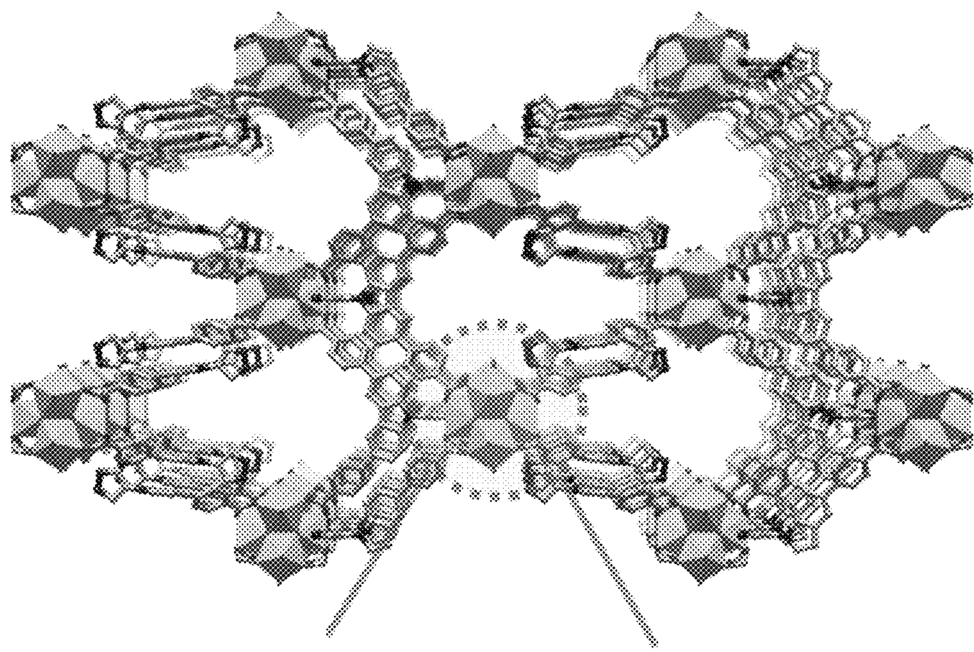
FIG. 2C shows a three-dimensional structure of BUT-86.
Figure 2D:
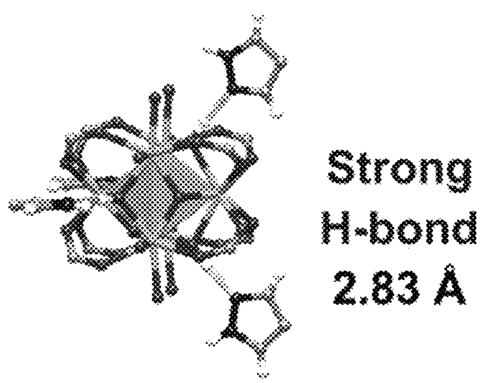
FIG. 2D shows an interlayer hydrogen bond between a pyrazolyl group and a $Zr_6$ cluster.
Figure 2E:
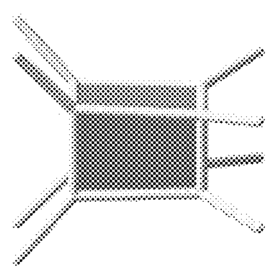
FIG. 2E shows the geometric simplification of a $Zr_6$ cluster.
Figure 2F:
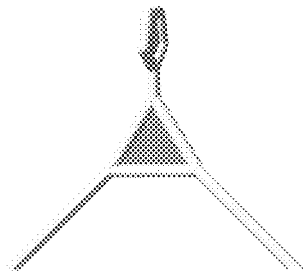
FIG. 2F shows the geometric simplification of a ligand.
Figure 2G:
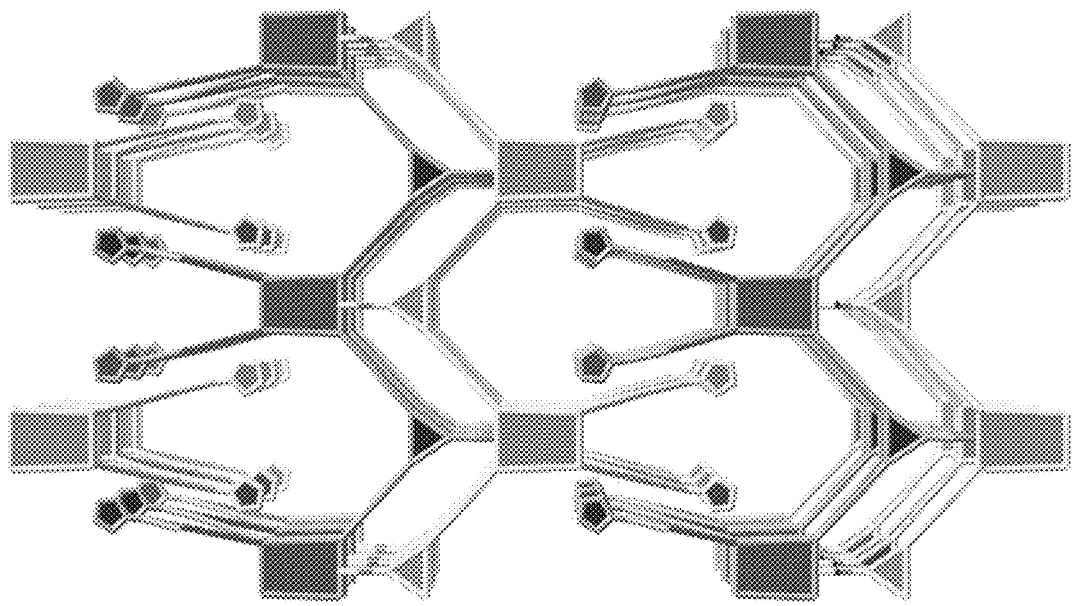
FIG. 2G shows an interdigitated two-dimensional layer.
Figure 2H:
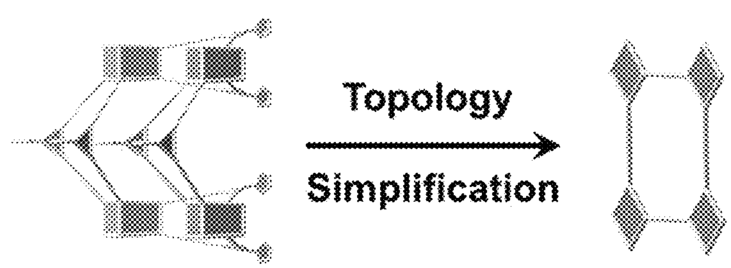
FIG. 2H shows the topology simplification of sql.
Figure 3:
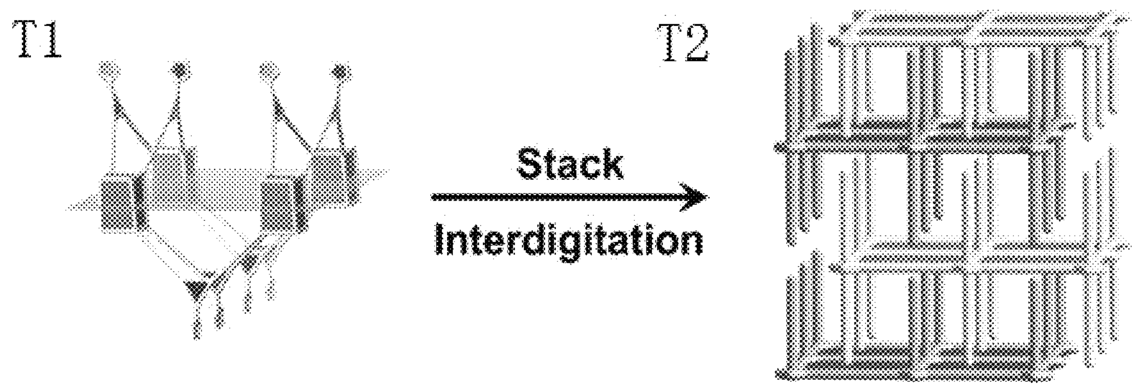
FIG. 3 is a schematic diagram of topology simplification of an interdigitated sql network of BUT-86, where (T1) shows a structural unit in BUT-86 and (T2) shows the simplification of an interdigitated sql layer in BUT-86.

Single-crystal X-ray diffraction (SCXRD) analysis shows that BUT-86 belongs to the $P4_2/nmc$ space group. The structure includes an 8-connected $Zr_6(\mu_3\text{-O})_4(\mu_3\text{-OH})_4(OH)_4(H_2O)_4(Zr_6)$ cluster and a bent $HPCDA^{2-}$ ligand (as shown in FIG. 2A and FIG. 2B). The $HPCDA^{2-}$ ligand includes a carbazolyl core as a center. The carbazolyl core is connected with a free pyrazolyl group and has two outward-stretched carboxyl groups, such that the bent carboxylic acid ligand with pyrazolyl functionalization is produced (as shown in FIG. 2B and FIG. 2F). The $HPCDA^{2-}$ ligand is paired with a neighboring ligand in a face-to-face manner through a C—H • • • π interaction (with a C—H • • • C distance of 3.42 Å) on a benzene ring of the $HPCDA^{2-}$ ligand to connect two $Zr^6$ clusters. The $Zr_6$ cluster in BUT-86 presents a pseudotetrahedral geometry (as shown in FIG. 2A and FIG. 2E). The $Zr_6$ cluster is alternately connected with the $HPCDA^{2-}$ ligand to produce a two-dimensional layered structure. Layers are arranged alternately in parallel and in opposite directions (as shown in FIG. 2C and FIG. 2G). Layers in opposite directions interact with each other through strong hydrogen bonding (as shown in FIG. 2D, an O • • • N distance is 2.83 Å) between $\mu_3$-OH and a nitrogen atom of a pyrazolyl group on the $Zr_6$ cluster to produce a three-dimensional structure (as shown in FIG. 2C and FIG. 2G). Topologically, the two-dimensional layered structure of BUT-86 can be simplified to a typical sql topological network (FIG. 2H). In BUT-86, the pyrazolyl group protrudes from a plane of the $Zr_6$ cluster and acts on a neighboring layer extending in an opposite direction through hydrogen bonding. Therefore, adjacent layers are arranged in an interdigitated manner to form a three-dimensional structure (FIG. 3). The BUT-86 provided by the present disclosure is the first Zr-MOF material with an interdigitated sql network, which enhances the stability of the material and promotes the excellent recognition and adsorption of guest molecules.

Figure 4:
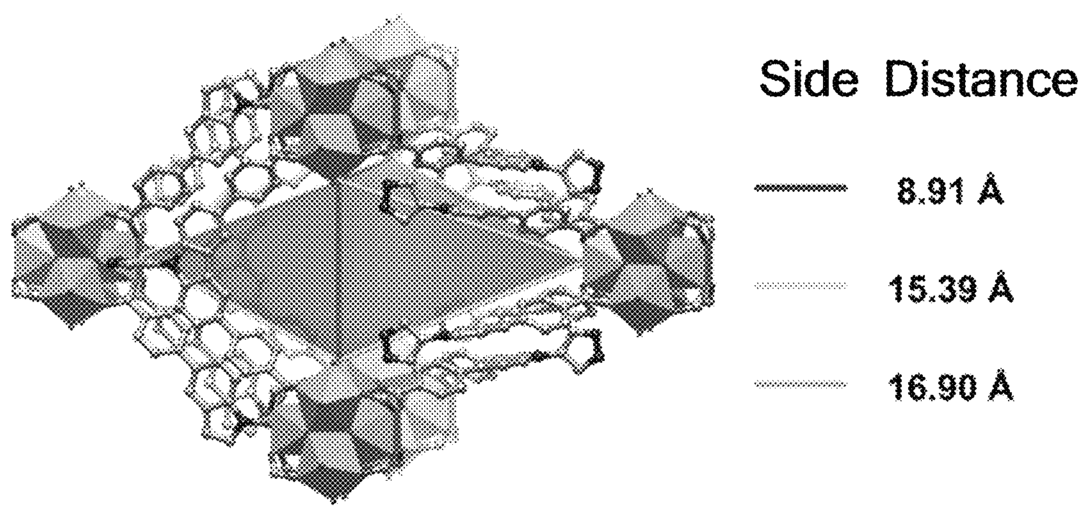
FIG. 4 is a schematic diagram of a structure of a cavity in an MOF material.

The structure in FIG. 4 shows that BUT-86 has a diamond-like cavity along a and b axes, with side lengths of 8.91 Å, 15.39 Å, and 16.90 Å, respectively. A pore volume to which a solvent has access is estimated by OLEX2 to be 62.3%.

(2) Characterization of Stability

The MOF material was soaked in different acid and alkali solutions, and then nitrogen adsorption curves of the MOF material were determined at 77 K. Specific operation steps were as follows: 100 mg of an activated freshly-synthesized material was weighed and soaked in each of 0.01 M NaOH, 1 M HCl, 1 M $H_2SO_4$, and saturated $H_2SO_3$ (about 1.5 M) solutions for 24 h at room temperature, and then the nitrogen adsorption curves were determined.

Figure 5:
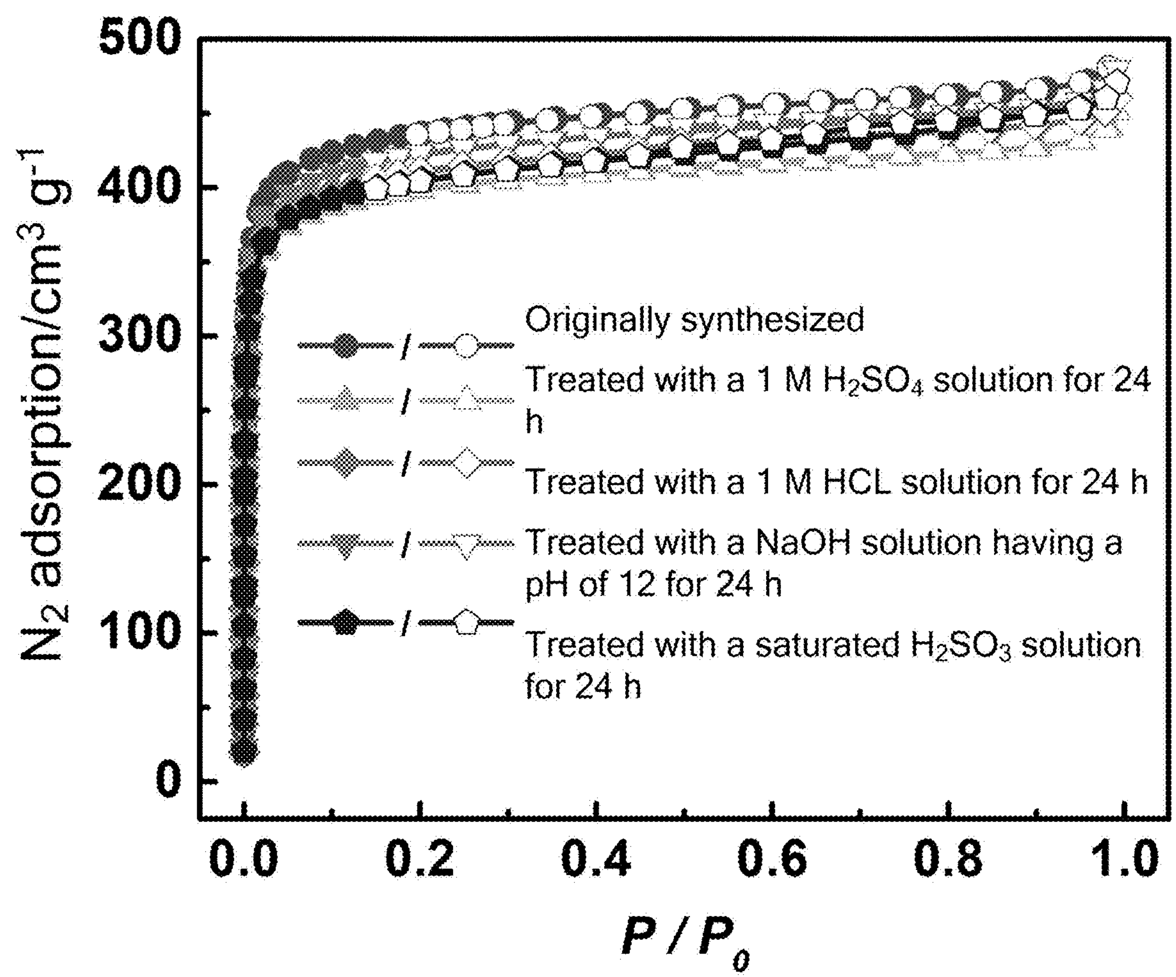
FIG. 5 shows 77 K nitrogen adsorption isotherms of an MOF material after treatments under different conditions.

FIG. 5 shows 77 K nitrogen adsorption curves of the MOF material after being soaked in different acid and alkali solutions. It can be seen from this figure that the MOF material retains a complete porosity in different acid and alkali solutions, a maximum $N_2$ adsorption capacity of the MOF material is 480 $cm^3 \cdot g^{-1}$, and a specific surface area calculated accordingly is 1,682 $m^2$ $g^{-1}$.

(3) Characterization of $SO_2$ Adsorption and Capture Performance

Figure 6:
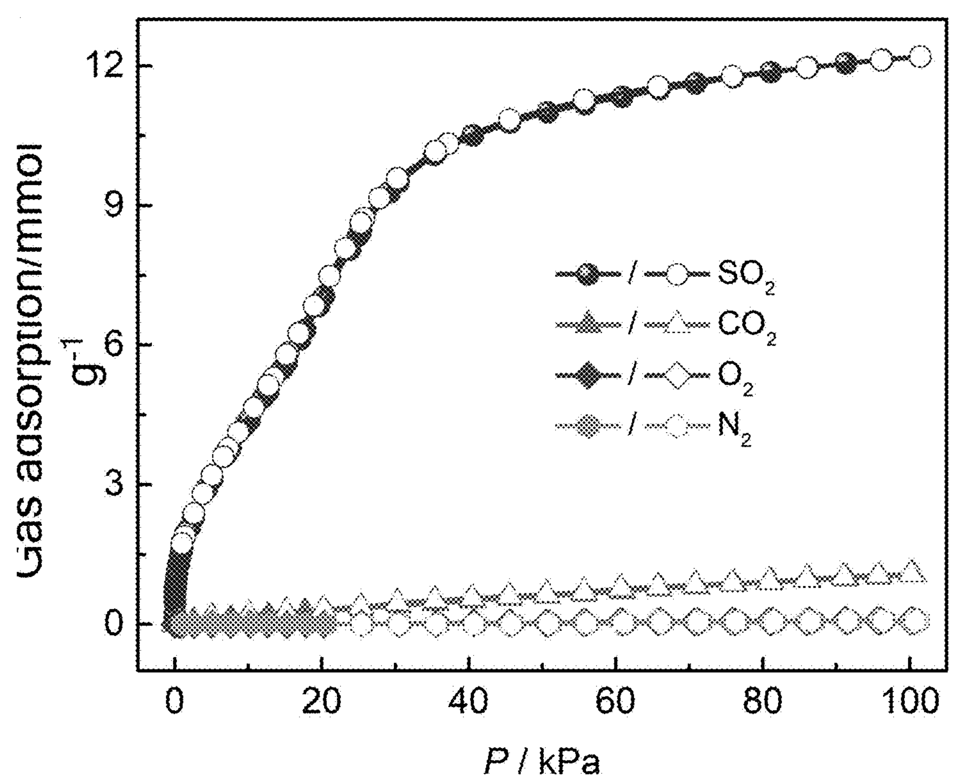
FIG. 6 shows 298 K $SO_2$ adsorption isotherms of an MOF material.

Activation before $SO_2$ adsorption: Before the gas adsorption, 2 mL of concentrated hydrochloric acid was added to 20 mL of DMF, 100 mg of the MOF powder sample prepared in Example 2 was added, and heating was conducted at 60° C. for 24 h. The DMF was decanted. The sample was transferred to a Soxhlet extractor with 300 mL of methanol under reflux and soaked at 95° C. to allow activation for 3 d. After the solvent exchange was completed, a sample was collected through centrifugation and naturally dried in the air for 2 h or more. Before an adsorption experiment, an air-dried sample was added to an adsorption tube and degassed for 24 h at room temperature. $SO_2$, $CO_2$, $O_2$, and $N_2$ isotherms were acquired with a temperature-controlled water bath. FIG. 6 shows gas adsorption isotherms of the MOF material at 298 K. It can be seen from this figure that maximum adsorption capacities of the MOF material for $SO_2$, $CO_2$, $O_2$, and $N_2$ at 298 K are 12.2 mmol $g^{-1}$, 1.07 mmol $g^{-1}$, 0.07 mmol $g^{-1}$, and 0.08 mmol $g^{-1}$, respectively.

Figure 7A:
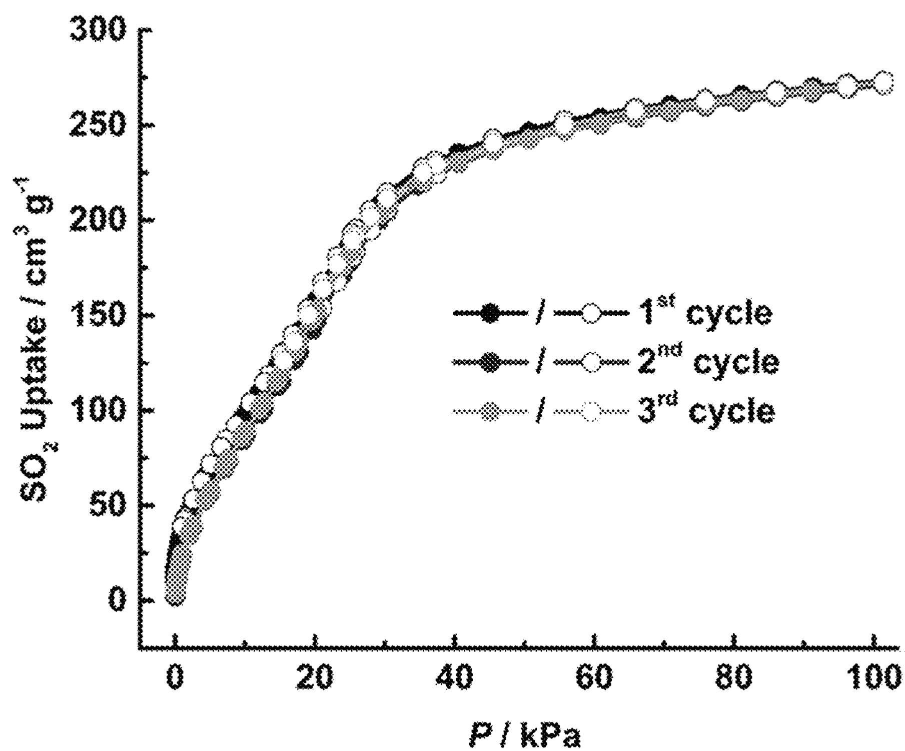
FIG. 7A shows $SO_2$ cyclic adsorption test results and FIG. 7B shows $N_2$ adsorption/desorption isotherms at 77 K.

After the adsorption of the activated BUT-86 material for $SO_2$ was completed, the activated BUT-86 material was placed in a fixed bed and heated for 40 min or more at 353 K and a nitrogen flow rate of 10 mL $min^{-1}$ to complete the desorption of $SO_2$. Then, the next round of adsorption could be conducted. After three $SO_2$ adsorption-desorption cycles, BUT-86 could still maintain its high $SO_2$ adsorption capacity (FIG. 7A), indicating the excellent reversible adsorption/desorption performance of the material. An $N_2$ adsorption isotherm of BUT-86 after a $SO_2$ adsorption test remained almost unchanged (FIG. 7B), further indicating the structural stability of the material during $SO_2$ adsorption measurement cycles.

(4) Capture Performance for Trace $SO_2$

Figure 8:
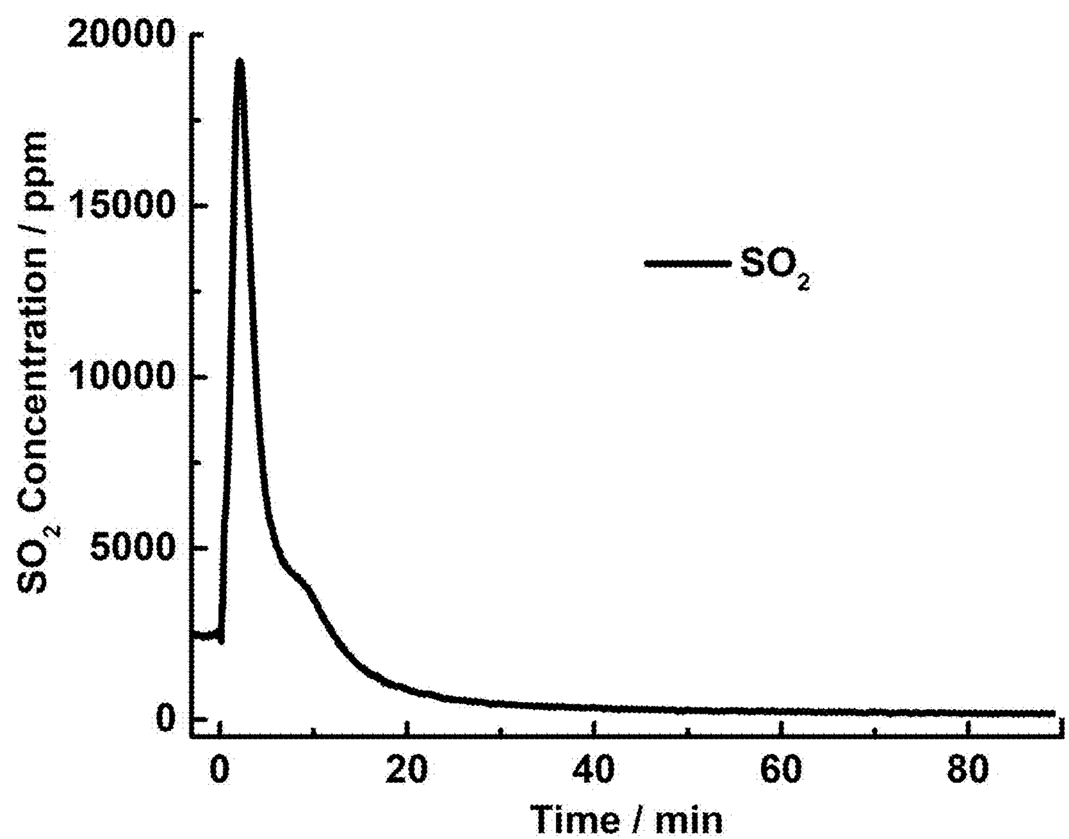
FIG. 8 shows the desorption of $SO_2$@BUT-86 at 353 K.

A dynamic penetration experiment was conducted at room temperature to evaluate the capture performance of BUT-86 for trace $SO_2$. The dynamic penetration experiment was conducted as follows: a mixed gas including 2,500 ppm $SO_2$ was allowed to flow through a column filled with 50 mg of a BUT-86 sample at a flow rate of 8 mL $min^{-1}$. Under dry conditions, a $SO_2$ penetration time was 49 min, which corresponded to an $SO_2$ capture capacity of 0.88 mmol $g^{-1}$. The above value was close to the static $SO_2$ adsorption capacity of 1.0 mmol $g^{-1}$ observed from an adsorption isotherm at a pressure of 0.25 kPa (as shown in FIG. 6). After $SO_2$ penetrated through BUT-86, BUT-86 could be fully regenerated at about 40 min after being heated to 353 K in a nitrogen atmosphere (as shown in FIG. 8).

Figure 9A:
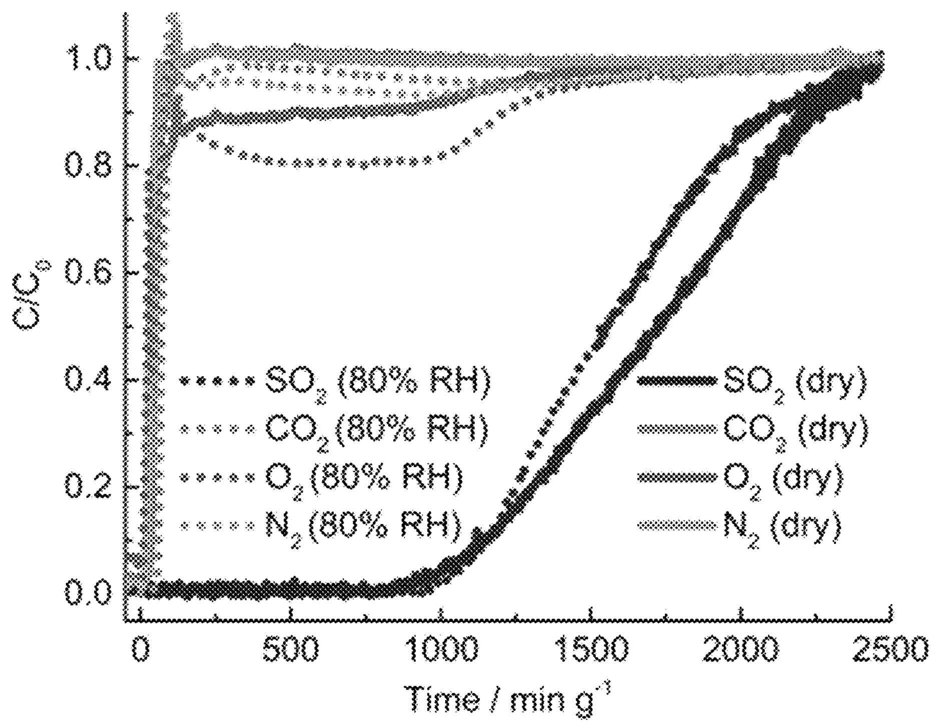
FIG. 9A shows dynamic penetration curves of BUT-86 for simulated flue gas mixtures.
Figure 9B:
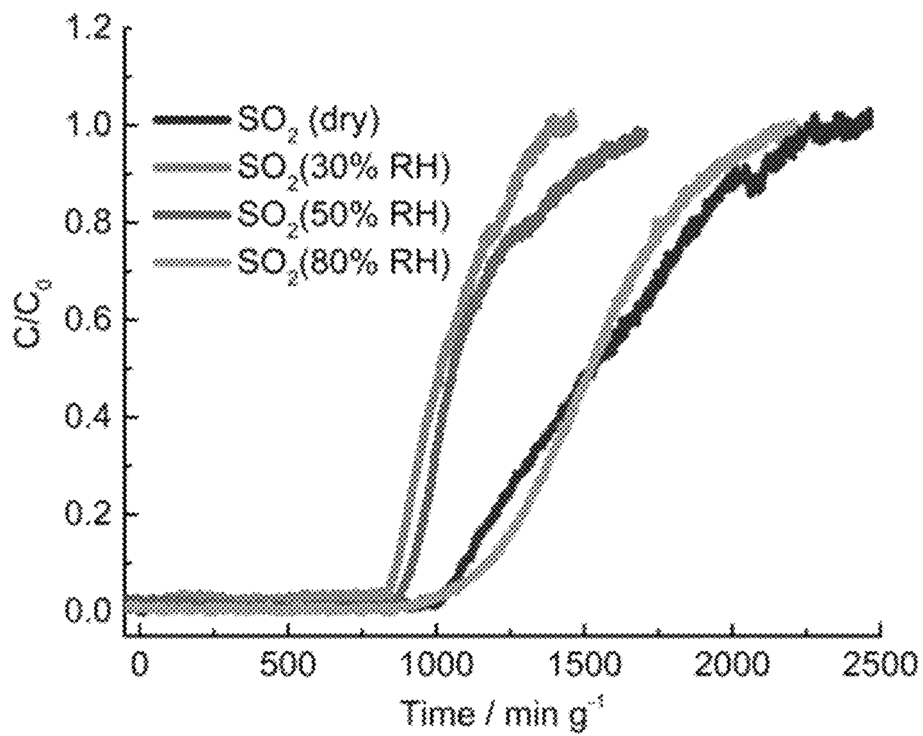
FIG. 9B shows dynamic penetration curves of BUT-86 for $SO_2$ (2,500 ppm)

In consideration of an actual flue gas desulfurization background, the $SO_2$ capture performance of BUT-86 at different humidities was tested (as shown in FIG. 9B). At relative humidities (RHs) of 30%, 50%, and 80%, $SO_2$ capture capacities were 0.74 mmol $g^{-1}$ (830 min $g^{-1}$), 0.78 mmol $g^{-1}$ (870 min $g^{-1}$), and 0.84 mmol $g^{-1}$ (940 min $g^{-1}$), respectively. The capture capacity at 80% RH was only 4% lower than the capture capacity under dry conditions, indicating that $H_2SO_3$ generated at the high humidity was conducive to the adsorption of $SO_2$ and BUT-86 had excellent acid stability and could resist the corrosion of $H_2SO_3$.

In a penetration experiment for BUT-86 with a four-component flue gas mixture including 2,500 ppm of $SO_2$, 13.5% of $CO_2$, 4% of $O_2$, and 82.25% of $N_2$, it was found that $CO_2$, $O_2$, and $N_2$ penetrated through BUT-86 almost immediately (as shown in FIG. 9A), and a retention time of $SO_2$ was 46 min corresponding to an $SO_2$ adsorption capacity of 0.82 mmol $g^{-1}$, which was 18% lower than the static adsorption capacity obtained from the adsorption isotherm. The above results indicated that BUT-86 exhibited high adsorption selectivity for $SO_2$.

Figure 7B:
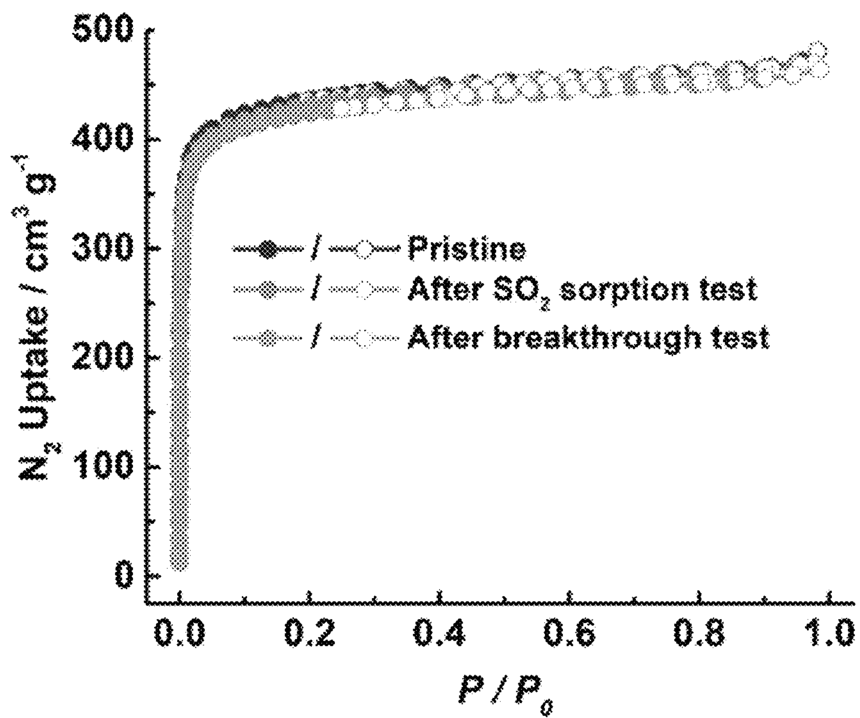
Figure 9C:
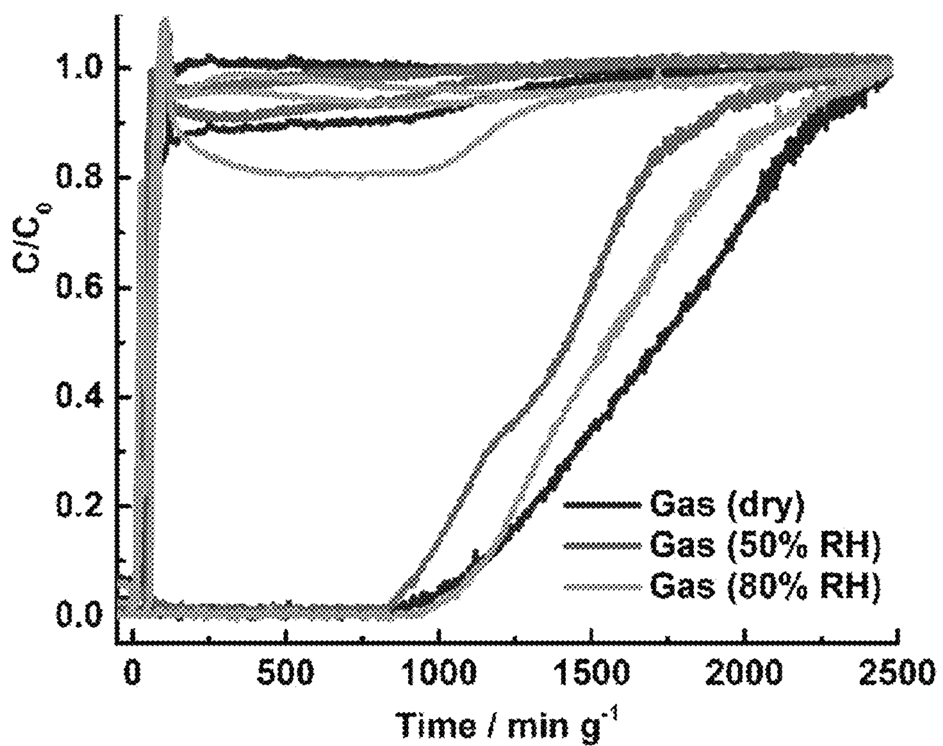
FIG. 9C shows penetration curves of BUT-86 at different humidities.
Figure 9D:
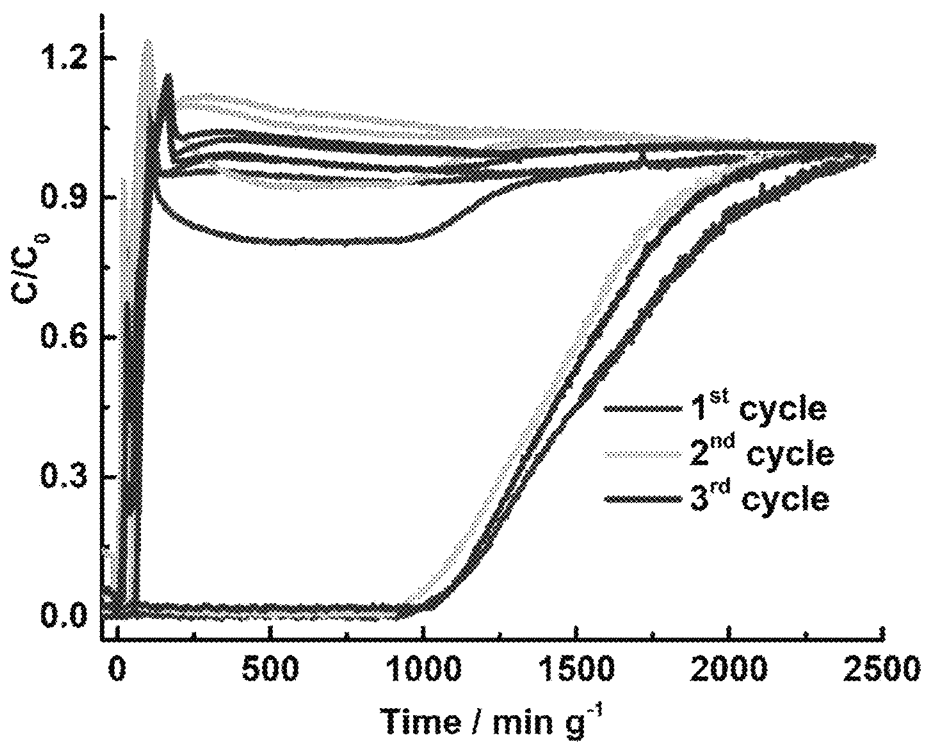
FIG. 9D shows cyclic penetration curves of BUT-86 at 80% RH.

Further studies showed that BUT-86 still exhibited prominent desulfurization performance for a simulated wet flue gas at 80% RH (as shown in FIG. 9A and FIG. 9C), and has an $SO_2$ adsorption capacity of 0.84 mmol $g^{-1}$, which was equal to an adsorption capacity for a single $SO_2$ component at 80% RH. The above results indicated that BUT-86 could maintain its $SO_2$ capture performance in a complicated gas mixture. Consecutive cyclic experiments showed that a $SO_2$ capture capacity of BUT-86 was not reduced significantly after BUT-86 underwent three consecutive penetration cycles at 80% RH (as shown in FIG. 9B), and the integrity of a frame of BUT-86 could be retained after penetration experiments (as shown in FIG. 7B).

When the simulated flue gas was under harsh conditions, namely, 80% RH and 323 K, BUT-86 exhibited an $SO_2$ adsorption capacity of 0.66 mmol $g^{-1}$. After ten consecutive penetration cycles, it was observed that a $SO_2$ capture capacity of BUT-86 was not significantly reduced. The excellent cycling stability of BUT-86 could be attributed to its strong acid stability. Due to a combined action of factors such as strong Zr—O coordinate bonds and strong interlayer hydrogen bonding in the structure, BUT-86 could maintain its desulfurization performance under harsh working conditions, which can hardly be allowed by other porous materials. The capture performance of BUT-86 for trace $SO_2$ was further tested. Test results were as follows: an adsorption capacity for 500 ppm $SO_2$ was 0.72 mmol $g^{-1}$, an adsorption capacity for 250 ppm $SO_2$ was 0.67 mmol $g^{-1}$, and an adsorption capacity for 100 ppm $SO_2$ was 0.51 mmol $g^{-1}$.

In addition, a single crystal structure of BUT-86 loaded with $SO_2$ (namely, $SO_2$@BUT-86) was determined. SCXRD analysis results showed that, after BUT-86 was loaded with $SO_2$, the overall structure of BUT-86 remained unchanged, and four complete bisulfite ($HSO_3^-$) molecules were identified at each $Zr_6$ cluster. These bisulfites were generated by replacing the original terminal —OH/$H_2O$ molecules on the $Zr_6$ cluster, revealing the reactive $SO_2$ adsorption inside BUT-86. The bisulfites interacted with the $\mu_3$-OH and the NH functional group of pyrazole on the cluster through hydrogen bonding, with hydrogen bonding distances of 3.58 Å and 2.98 Å, respectively, and the hydrogen bonding between the $Zr_6$ cluster and the pyrazole nitrogen atom was stronger than the hydrogen bonding in a non-guest state (a hydrogen bonding distance was reduced from 2.83 Å to 2.81 Å). Further, a single crystal structure was determined for $SO_2$@BUT-86 purged with nitrogen at 353 K for 40 min (namely, $SO_2$@BUT-86-purged). Determination results showed that a diffraction peak associated with a bisulfite disappeared and —OH/$H_2O$ on the $Zr_6$ cluster could be accurately identified once again. The above results proved that bisulfites resulting from $SO_2$ adsorption could be removed under mild heating conditions, indicating that BUT-86 allowed a reversible $SO_2$ adsorption and desorption process. The present disclosure provides an MOF material allowing the reversible reactivity capture of $SO_2$ for the first time.

(5) Research on an Adsorption Mechanism

Figure 10:
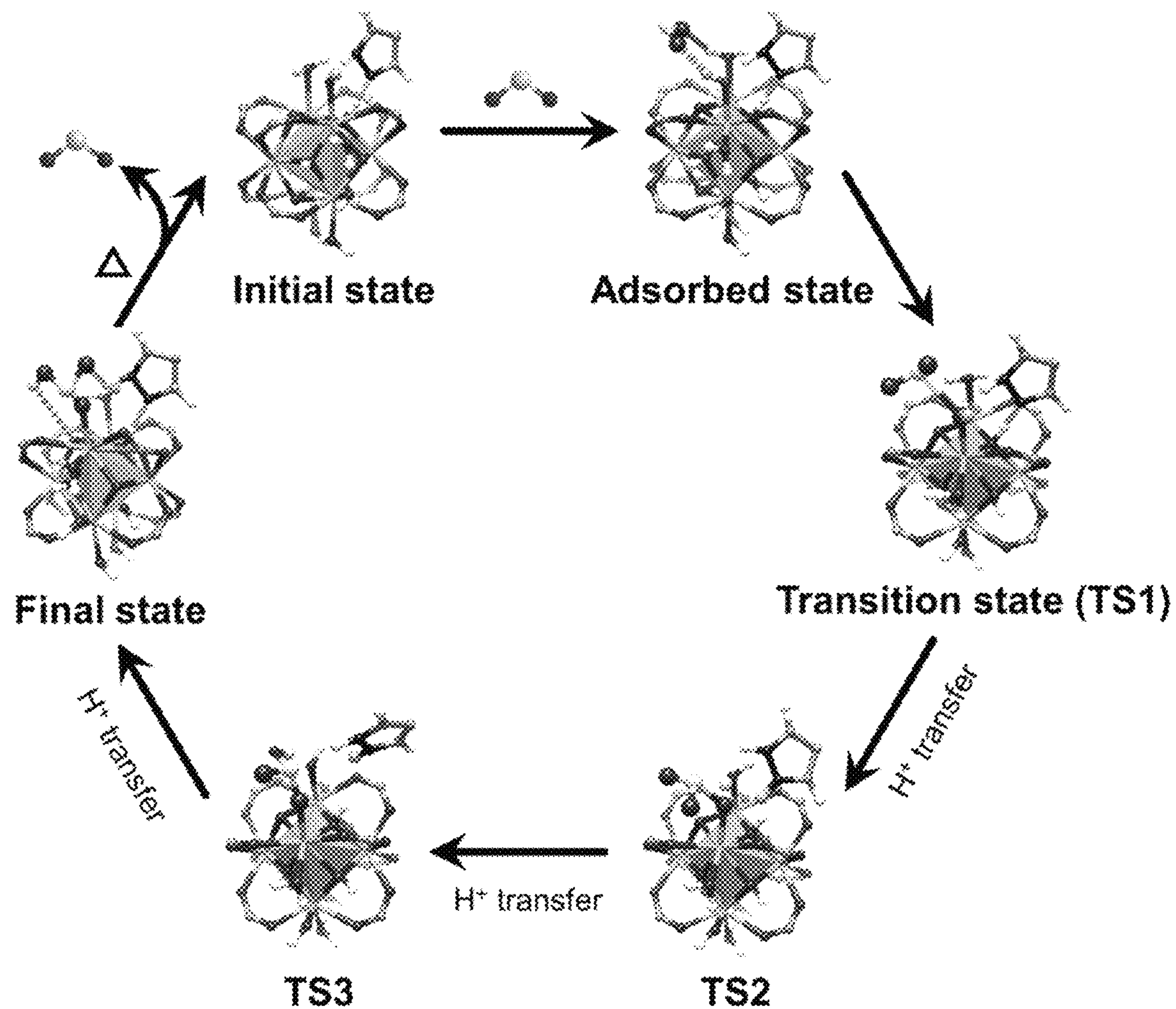
FIG. 10 is a schematic diagram of a mechanism of reactive adsorption for $SO_2$.

As shown in FIG. 10, in pores of BUT-86, $SO_2$ molecules approached the $Zr_6$ cluster and the pyrazolyl group, and interacted with these groups through N—H and —OH hydrogen bonds on these groups. $SO_2$ was first attacked by an oxygen atom of the —OH group and then immobilized on the $Zr_6$ cluster to produce an intermediate Zr—$OH^+$—$SO_2$, which was defined as a transition state 1 (TS1). Then, one $H^+$ was transferred to the pyrazolyl group to produce a bisulfite (Zr—$SO_3$H) (a transition state 2, TS2), while another $H^+$ migrated from the neighboring terminal —$OH_2$ to maintain a charge balance (a transition state 3, TS3). During the desorption of $SO_2$, $SO_2$ was released with the migration of protons.

The pyrazolyl group played a crucial role in the adsorption. The N atom could serve as a proton acceptor to form a hydrogen bond with the $Zr_6$ cluster. The NH functional group could serve as a donor for the transfer of a proton to a bisulfite, thereby promoting the stability of the entire complicated structure. This unique action mechanism, especially the hydrogen bonding among the pyrazolyl group, the $Zr_6$ cluster, and the sulfite, not only maintained the structural stability of BUT-86, but also contributed to the formation and stabilization of a transition state, thereby effectively promoting the capture and release of $SO_2$.

The pyrazolyl group in BUT-86 activated a $SO_2$ molecule through hydrogen bonding between N—H and a sulfur atom to reduce an electron density of sulfur, such that $SO_2$ was easily attacked by —OH. The additional lewis basicity provided by the pyrazolyl group enhanced the reactivity of —OH, thereby facilitating the capture of $SO_2$.

In addition, the terminal water molecule on the $Zr_6$ cluster played an important proton donor role in the adsorption of $SO_2$. The guest water molecule, as a proton donor, participated in the reactive adsorption of $SO_2$ around a $SO_2$ binding site. Single crystal data of BUT-86 loaded with a water molecule ($H_2O$@BUT-86) showed that the guest water molecule was distributed in an isolated cavity between adjacent $Zr_6$ clusters, but was not near the pyrazolyl group. The above results indicated that the adsorption of a water molecule occurred at a different position from a $SO_2$ adsorption site, which avoided the co-adsorption of the water molecule instead of $SO_2$ at a high humidity.

A binding site of a water molecule was further determined by acquiring single crystal data of BUT-86 loaded with the water molecule ($H_2O$@BUT-86). A single crystal structure of $H_2O$@BUT-86 showed that two types of guest water molecules were distributed in an isolated cavity between adjacent $Zr_6$ clusters, but were not near the pyrazolyl group (as shown in FIG. 5-30*c*). The above results indicated that the adsorption of a water molecule occurred at a different position from a $SO_2$ adsorption site, which avoided the co-adsorption of the water molecule instead of $SO_2$ at a high humidity. Crucially, these guest water molecules, as proton donors, could participate in the reactive adsorption of $SO_2$ around a $SO_2$ binding site.

What is claimed is:

1. A layered metal-organic framework (MOF) material based on bifunctional ligand Zr, having a chemical formula as follows:

$$[Zr_6(\mu_3\text{-}O)_4(\mu_3\text{-}OH)_4(OH)_4(H_2O)_4(HPCDA)_4],$$

wherein $Zr_6$ is an ionic cluster, $\mu_3$-O/$\mu_3$-OH is a bridging oxygen atom on a $Zr_6$ cluster, OH/$H_2O$ is a hydroxide ion/water molecule on the $Zr_6$ cluster, and HPCDA is a 4,4'-(9-(1H-pyrazol-4-yl)-9H-carbazol-3,6-diyl)dibenzoate ion;

from a perspective of a frame connection and construction, a crystal structure of the layered MOF material is a tetragonal crystal system, with a space group of $P4_2/nmc$ and the following unit cell parameters: a=b=18.5994(±2) Å, c=32.9902(±4) Å, $\alpha=\beta=\gamma=90°$, and V=11412.6(±3) $Å^3$;

the layered MOF material is composed of a two-dimensional layered structure, wherein the two-dimensional layered structure is an sql topological network structure, and the two-dimensional layered structure is stacked in an interdigitated manner to form a three-dimensional integral structure;

a structure of the layered MOF material comprises first $Zr^{4+}$ and second $Zr^{4+}$, wherein the first $Zr^{4+}$ and the second $Zr^{4+}$ have different connection relationships; the first $Zr^{4+}$ coordinates with four O atoms from different ligands, two $\mu_3$-O, and two $\mu_3$-OH; the second $Zr^{4+}$ coordinates with two O atoms from different ligands, two $\mu_3$-O, two $\mu_3$-OH, one terminal OH, and one terminal $H_2O$; and three first $Zr^{4+}$ and three second $Zr^{4+}$ produce the $Zr_6$ cluster through the $\mu_3$-O and the $\mu_3$-OH; and each HPCDA stacks face-to-face with adjacent HPCDA through $\pi \ldots \pi$ interactions between benzene rings, with a center distance of 3.80 Å; the $Zr_6$ cluster is interconnected in a face-to-face manner with paired HPCDA ligands to form a two-dimensional layer, wherein the two-dimensional layer is an sql topological network.

2. A bifunctional ligand, wherein the bifunctional ligand is 4,4'-(9-(1H-pyrazol-4-yl)-9H-carbazol-3,6-diyl)dibenzoic acid, and is referred to as $H_3PCDA$; a central core of the bifunctional ligand is a carbazolyl group connected with a first benzoic acid group, a second benzoic acid group, and a pyrazolyl group; an angle between a first dashed line formed due to an extension of the first benzoic acid group to the carbazolyl group and a second dashed line formed due to an extension of the second benzoic acid group to the carbazolyl group is 90°; included angles of the pyrazolyl group with the first dashed line and the second dashed line each are independently 135°; and a structural formula of the $H_3PCDA$ is as follows:

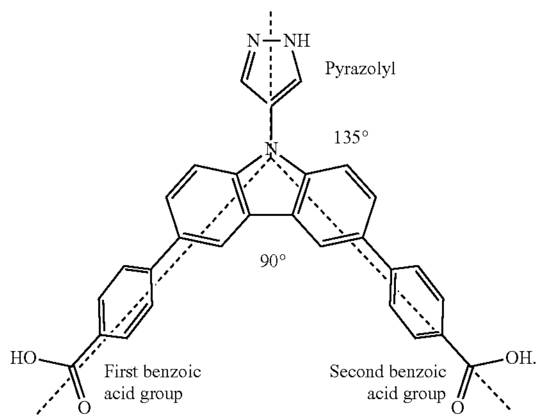

3. A preparation method of the bifunctional ligand according to claim 2, comprising the following steps:

S1, mixing 3,6-dibromo-9H-carbazole, 4-iodo-1-(tetrahydro-2H-pyran-2-yl)-1H-pyrazole, cesium carbonate, lithium chloride, cuprous iodide, and N,N-dimethylformamide (DMF), and conducting a first reaction for 24 h to 48 h at a pressure of 0.1 MPa to 0.3 MPa and a temperature of 80° C. to 110° C. in an inert atmosphere to obtain 3,6-dibromo-9-(1-(tetrahydro-2H-pyran-2-yl)-1H-pyrazol-4-yl)-9H-carbazole; wherein the 3,6-dibromo-9H-carbazole, the 4-iodo-1-(tetrahydro-2H-pyran-2-yl)-1H-pyrazole, the cesium carbonate, the lithium chloride, and the cuprous iodide are in a weight ratio of 20.0:(18.1-20.7):(18.7-21.6):(5.4-7.4):(0.6-0.8), and a concentration of the 3,6-dibromo-9H-carbazole in the DMF is 60 g/L to 70 g/L;

S2, mixing the 3,6-dibromo-9-(1-(tetrahydro-2H-pyran-2-yl)-1H-pyrazol-4-yl)-9H-carbazole, 4-(methoxycarbonyl)phenyl)boronic acid, potassium carbonate, tetrakis(triphenylphosphine)palladium, and 1,4-dioxane, and conducting a second reaction for 12 h to 24 h at a pressure of 0.1 MPa to 0.3 MPa and a temperature of 80° C. to 100° C. in the inert atmosphere to obtain dimethyl 4,4'-(9-(1-(tetrahydro-2H-pyran-2-yl)-1H-pyrazol-4-yl)-9H-carbazol-3,6-diyl)dibenzoate; wherein the 3,6-dibromo-9-(1-(tetrahydro-2H-pyran-2-yl)-1H-pyrazol-4-yl)-9H-carbazole, the 4-(methoxycarbonyl)phenyl)boronic acid, the potassium carbonate, and the tetrakis(triphenylphosphine)palladium are in a weight ratio of 15:(12.5-14.5):(13.1-14.4):(3.7-4.6), and a concentration of the 3,6-dibromo-9-(1-(tetrahydro-2H-pyran-2-yl)-1H-pyrazol-4-yl)-9H-carbazole in the 1,4-dioxane is 60 g/L to 65 g/L;

S3, allowing the dimethyl 4,4'-(9-(1-(tetrahydro-2H-pyran-2-yl)-1H-pyrazol-4-yl)-9H-carbazol-3,6-diyl) dibenzoate to undergo a third reaction under reflux for 8 h to 12 h in a hydrochloric acid-ethanol solution with a concentration of 2 M, adding deionized water to obtain a first mixture, adjusting a pH of the first mixture to 8 to 10 to make a first precipitate completely precipitated, and conducting a first suction filtration to obtain methyl 4-(3,6-bis(1H-pyrazol-4-yl)-9H-carbazol-9-yl)benzoate; wherein a concentration of the dimethyl 4,4'-(9-(1-(tetrahydro-2H-pyran-2-yl)-1H-pyrazol-4-yl)-9H-carbazol-3,6-diyl)dibenzoate in the hydrochloric acid-ethanol solution is 30 g/L to 40 g/L, and a volume ratio of the hydrochloric acid-ethanol solution to the deionized water is 1:1 to 1:3; and S4, allowing the methyl 4-(3,6-bis(1H-pyrazol-4-yl)-9H-carbazol-9-yl)benzoate to undergo a fourth reaction under reflux for 8 h to 12 h in a mixture of potassium hydroxide, tetrahydrofuran, methanol, and the deionized water to obtain a second mixture, adjusting a pH of the second mixture to 6 to 8 to make a second precipitate completely precipitated, and conducting a second suction filtration to obtain the bifunctional ligand; wherein a weight ratio of the methyl 4-(3,6-bis(1H-pyrazol-4-yl)-9H-carbazol-9-yl)benzoate to the potassium hydroxide is 2.1:(3.0-5.0), a concentration of the methyl 4-(3,6-bis(1H-pyrazol-4-yl)-9H-carbazol-9-yl)benzoate in the tetrahydrofuran is 23 g/L to 35 g/L, and the tetrahydrofuran, the methanol, and the deionized water are in a volume ratio of 1:(1-1.5):(1-1.5).

4. A preparation method of the layered MOF material according to claim 1, comprising the following steps:

mixing a ligand, a metal salt, and a solvent, and conducting a reaction for 12 h to 48 h at a pressure of 0.1 MPa to 0.5 MPa and a temperature of 80° C. to 135° C. in an inert atmosphere to obtain the layered MOF material, wherein the metal salt is selected from one or more of zirconium tetrachloride and zirconium oxychloride octahydrate.

5. The preparation method of the layered MOF material according to claim 4, wherein the metal salt comprises the zirconium tetrachloride and/or the zirconium oxychloride octahydrate, when the metal salt is a mixture of the zirconium tetrachloride and the zirconium oxychloride octahydrate, a molar ratio of the zirconium tetrachloride to the zirconium oxychloride octahydrate is 1:(1-2); the solvent is a mixture of water and an organic solvent in a volume ratio of (0.2-0.8):(1-4); the organic solvent is one or more of DMF, acetic acid, dimethyl sulfoxide (DMSO), and N-methylpyrrolidone (NMP); a molar ratio of the ligand to the metal salt is 1:(2-6); and a concentration of the metal salt in the solvent is 0.04-0.15 mol/L.

* * * * *